(12) United States Patent
Zhao et al.

(10) Patent No.: US 6,756,938 B2
(45) Date of Patent: Jun. 29, 2004

(54) SATELLITE POSITIONING SYSTEM RECEIVERS AND METHODS THEREFOR

(75) Inventors: Yilin Zhao, Northbrook, IL (US); Thomas M. King, Tempe, AZ (US); George J. Geier, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/993,108

(22) Filed: Nov. 6, 2001

(65) Prior Publication Data

US 2003/0085838 A1 May 8, 2003

(51) Int. Cl.$^7$ ................................................ H04B 7/185
(52) U.S. Cl. ............................ 342/357.09; 342/357.02; 342/357.06; 701/214; 701/213
(58) Field of Search .................. 342/357.09, 357.02, 342/357.06, 357.13; 701/214, 213

(56) References Cited

U.S. PATENT DOCUMENTS

| | | | |
|---|---|---|---|
| 4,114,155 A | | 9/1978 | Raab |
| 4,426,712 A | | 1/1984 | Gorski-Popiel |
| 5,087,919 A | * | 2/1992 | Odagawa et al. ...... 342/357.13 |
| 5,225,842 A | | 7/1993 | Brown |
| 5,434,574 A | * | 7/1995 | Hayashi et al. ........ 342/357.11 |
| 5,646,857 A | | 7/1997 | McBurney et al. |
| 5,663,735 A | | 9/1997 | Eshenbach |

(List continued on next page.)

FOREIGN PATENT DOCUMENTS

EP          0606890 A1  *  7/1994   ............. G01S/5/14

OTHER PUBLICATIONS

Mapping, charting, and geodesy in the DoD standard GPS receivers, W.S. Parker et al., IEEE Position Location and Navigation Symposium, p. 145–152, Nov. 29–Dec. 2, 1988.*

An overview of a Global Positioning System Mission Planner implemented on a personal computer; P.G. Avila et al.; IEEE Aerospace and Electronics Systems Magazine, vol. 5(1), p. 10–18, Jan. 1990.*

(List continued on next page.)

*Primary Examiner*—Thomas H. Tarcza
*Assistant Examiner*—F H Mull
(74) *Attorney, Agent, or Firm*—Roland K. Bowler, II (57) ABSTRACT

Methods for determining the location of a satellite positioning system receiver by determining an estimated location of the receiver (200), transmitting the estimated location of the receiver to a network, determining a reference altitude of the receiver at the network based upon the estimated location of the receiver (210), and determining a new location of the receiver based upon the reference altitude of the receiver (220). In some embodiments, terrain slope is determined at the estimated location for use in updating the estimated location. In some embodiments, satellite information and weighting factors used to estimate receiver location along with other parameters are utilized to update the estimated location.

22 Claims, 6 Drawing Sheets

U.S. PATENT DOCUMENTS

| | | | | |
|---|---|---|---|---|
| 5,731,785 | A | * | 3/1998 | Lemelson et al. ..... 342/357.07 |
| 5,841,396 | A | | 11/1998 | Krasner |
| 5,890,090 | A | * | 3/1999 | Nelson, Jr. .................. 701/213 |
| 6,061,018 | A | * | 5/2000 | Sheynblat ............. 342/357.06 |
| 6,157,342 | A | * | 12/2000 | Okude et al. .......... 342/357.13 |
| 6,191,731 | B1 | | 2/2001 | McBurney et al. |
| 6,208,290 | B1 | | 3/2001 | Krasner |
| 6,208,292 | B1 | | 3/2001 | Sih et al. |
| 6,289,280 | B1 | * | 9/2001 | Fernandez-Corbaton et al. ..................... 342/357.02 |
| 6,307,504 | B1 | | 10/2001 | Sheynblat |
| 6,389,291 | B1 | | 5/2002 | Pande et al. |
| 6,407,703 | B1 | * | 6/2002 | Minter et al. ............... 342/450 |
| 6,421,002 | B2 | | 7/2002 | Krasner |
| 6,427,120 | B1 | | 7/2002 | Garin et al. |
| 6,429,809 | B1 | | 8/2002 | Vayanos et al. |
| 6,429,814 | B1 | * | 8/2002 | van Diggelen et al. . 342/357.13 |
| 6,434,485 | B1 | * | 8/2002 | Beason et al. .............. 701/213 |
| 6,453,237 | B1 | * | 9/2002 | Fuchs et al. ................ 701/213 |
| 6,473,031 | B1 | * | 10/2002 | Harris ................... 342/357.09 |

OTHER PUBLICATIONS

Spatial Terrain Displays: Promises And Potential Pitfalls, Dr. E. Theunissen, http://www.d⁻lphins.tudelft.nl/terrain1.html, Mar. 28, 2000.*

CompactGPS Product Overview. Pretec Electronics Corp., Jun. 28, 2000.*

E.D. Holm And E.E. Westerfield, "A GPS Fast Acquisition Receiver", IEEE 1983 National Telesystems Conference, Feb. 1983.

* cited by examiner

SATELLITE POSITIONING SYSTEM RECEIVERS AND METHODS THEREFOR

FIELD OF THE INVENTIONS

The present inventions relate generally to satellite positioning system receivers, and more particularly to locating satellite positioning system enabled mobile wireless communications handsets.

BACKGROUND OF THE INVENTIONS

U.S. Pat. No. 5,225,842 entitled "Vehicle Tracking System Employing Global Positioning System (GPS) Satellites" discloses a vehicle tracking system comprising a master station that computes and displays the position of a large number of vehicles using GPS sensor data transmitted from the vehicles at low data rates. The master station also computes an aided navigation solution for vehicles that report sensor data from less than four satellites by estimating altitude from a digital map.

U.S. Pat. No. 5,646,857 entitled "Use of An Altitude Sensor to Augment Availability of GPS Location Fixes" discloses integrating elevation readings from an altimeter or barometer with global positioning system (GPS) determined elevation coordinates at the same location as the altimeter or barometer reading.

U.S. Pat. No. 6,061,018 entitled "Method And System For Using Altitude Information In A Satellite Positioning System" discloses a mobile satellite positioning system (SPS) receiver that transmits satellite pseudo-range data to GPS location server, which computes the position of the SPS receiver using altitude aiding information. The GPS location server estimates the altitude of the receiver based upon the altitude of the cell site in which the receiver is located, for example the approximate altitude of the cell site transmitter or a mathematical representation of the altitude in the geographical vicinity of the transmitter.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
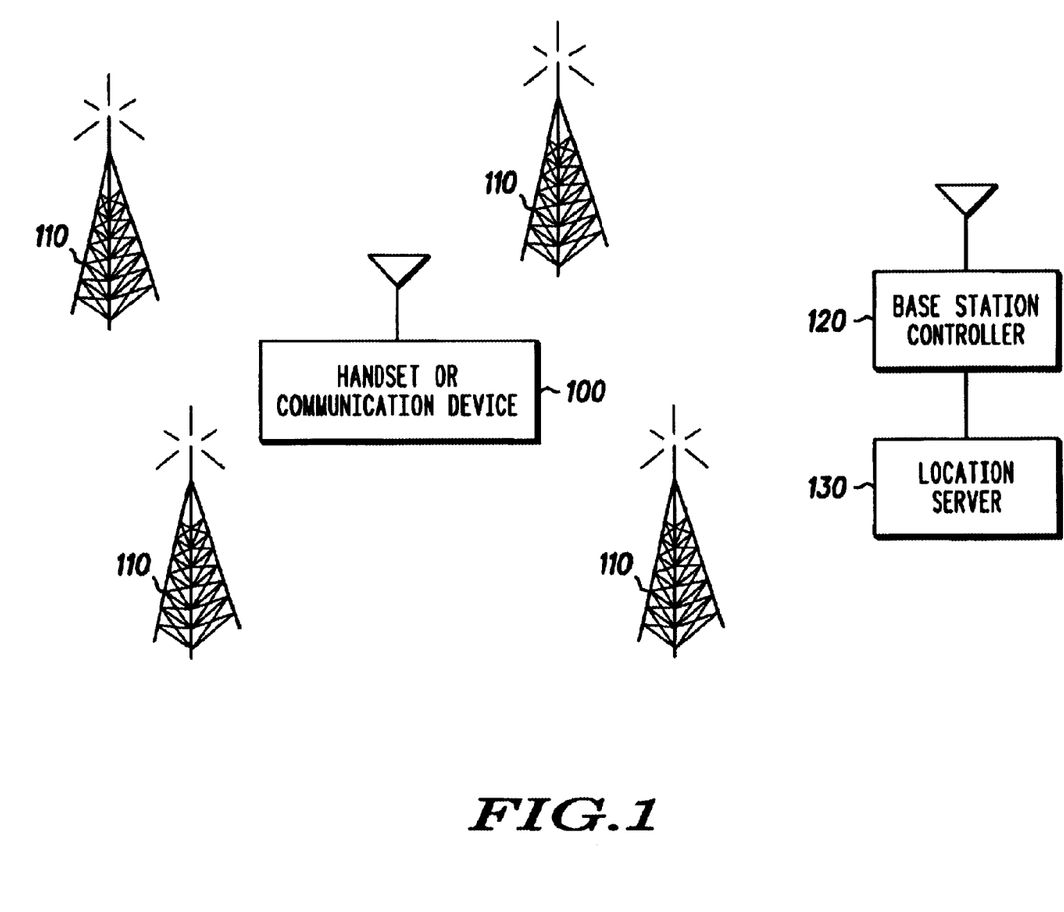
FIG. 1 is an exemplary GPS receiver in a cellular communication system.

FIG. 1 illustrates an exemplary GPS enabled wireless communication handset 100 in a cellular radiotelephone communication system comprising a plurality of cellular base stations (BS) 110 communicating with a common base station controller (BSC) 120 coupled to a location server 130, for example a GPS server. The location server may be coupled to the BSC by a serving mobile location center (SMLC) or by a mobile switching center and visitor location register (MSC/VLR), which are well known in the art but not illustrated in the drawing. It may also be linked or coupled directly to a BS. The GPS enabled handset 100 is more generally any satellite positioning system receiver, and the communication system is any network that communicates with the receiver.

The inventors recognize desirability of aiding a satellite positioning system, for example a Global Positioning System (GPS), solution with altitude information. Constraining the altitude of a GPS solution to the correct elevation provides increased accuracy in the latitude/longitude dimension. Altitude information permits position fix determination with only three satellites. It also improves the accuracy of solutions if more than three satellites are visible. The inclusion of altitude information derived from a terrain map reduces the sensitivity to off-nominal conditions, even for solutions including terrestrial measurements integrated with GPS measurements.

Figure 2:
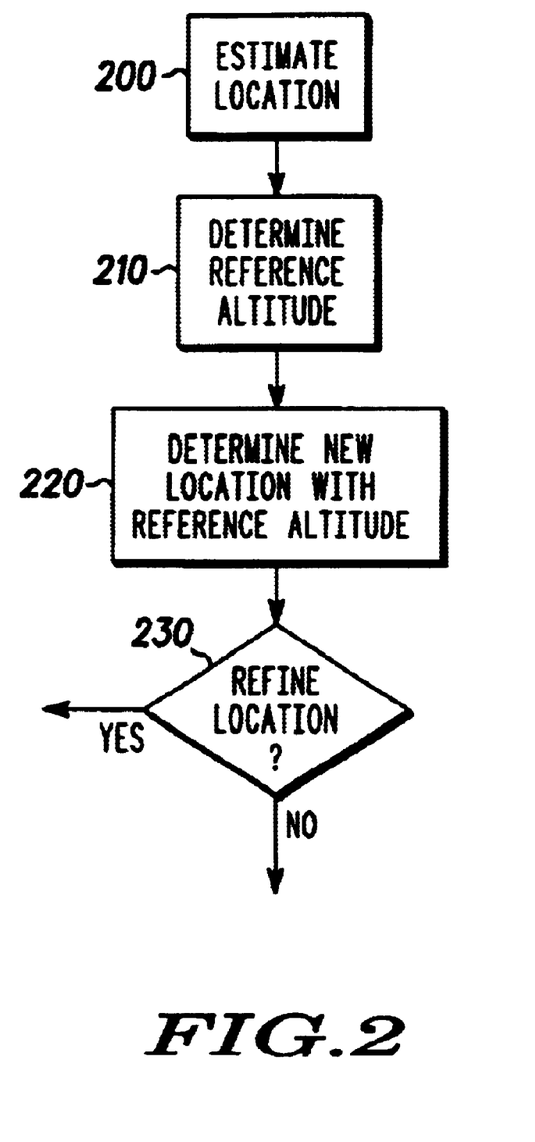
FIG. 2 is a first exemplary flow diagram.

In FIG. 2, an estimated location of a satellite positioning system receiver is determined at block 200. In one embodiment, the estimated location determination is made at the receiver, although in other embodiments the estimated location may be made at the network, for example upon sending satellite information, e.g. pseudo-range information, from the receiver to the location server.

In FIG. 2, at block 210, a reference altitude of the receiver is determined based upon the estimated location, for example by using latitude and longitude information from the estimated location to index the reference altitude on a terrain map or database. In one embodiment, in FIG. 3, the estimated location determined at the receiver is transmitted to the network at block 312, and the network determines the reference altitude of the receiver based upon the estimated location of the receiver at block 314. In another embodiment, the reference altitude of the receiver is determined at the receiver, for example based upon altitude data stored on the receiver, for example by averaging 3-dimensional position fixes stored previously in memory on the receiver, simply by using the last known altitude from a most recently determined last 3-dimensional position fix, or by utilizing the output of an altitude sensor or other devices. These devices can be either attached or integrated to the receiver or communicate remotely with the receiver from their own locations.

Figure 3:
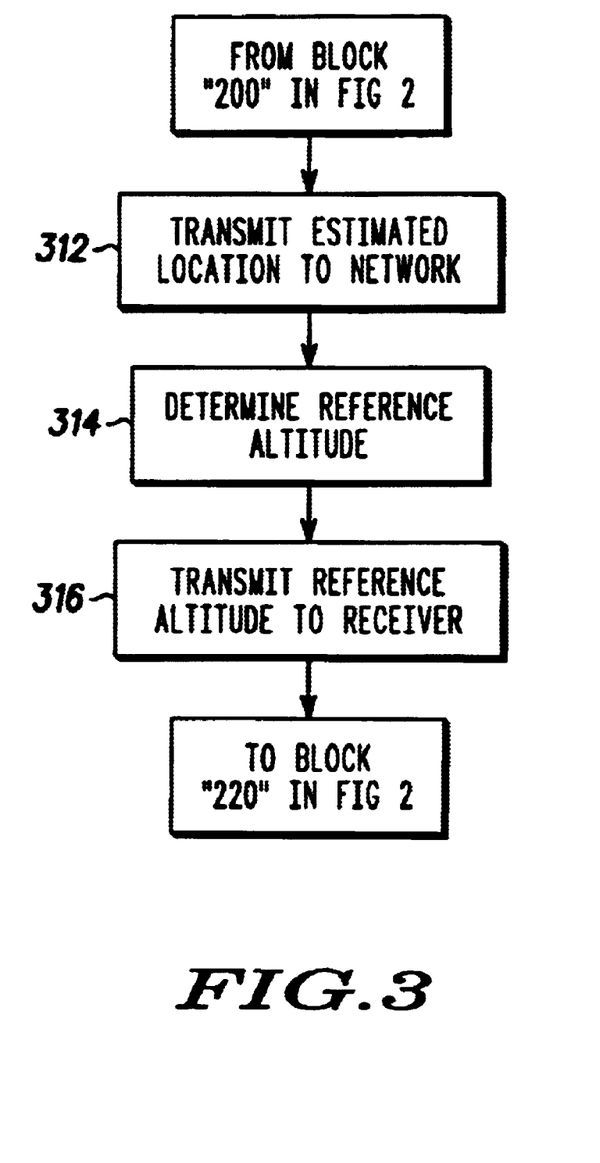
FIG. 3 is a second exemplary flow diagram.

In FIG. 3, at block 316, the network transmits the reference altitude determined from the estimated location to the receiver. In FIG. 2 a new receiver location is calculated with the reference altitude at block 220 at the receiver. In alternative embodiments, the new or revised receiver location is determined or calculated at the network, as discussed below. The receiver location may be refined at block 230 as discussed below.

Figure 4:
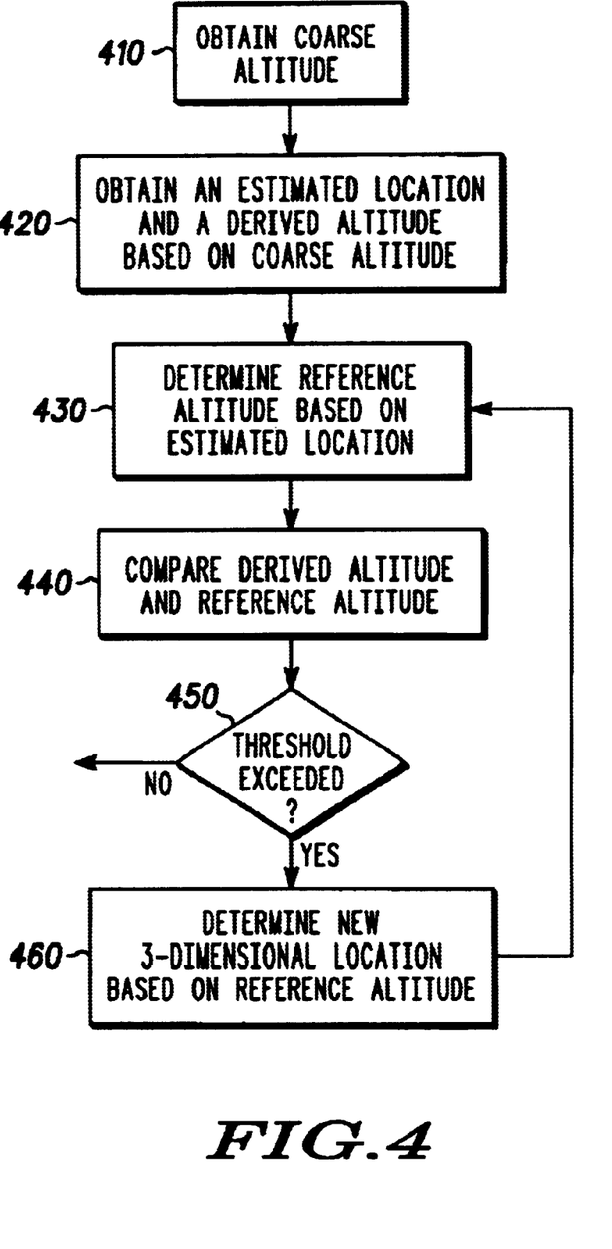
FIG. 4 is a third exemplary flow diagram.

In FIG. 4, coarse altitude, obtained at block 410, is used to determine the estimated location of the receiver at block 420. In one embodiment, the coarse altitude is the average altitude of the serving cell site or portion thereof or altitude of the base station antenna. The course altitude may be communicated to the receiver in applications where the receiver determines the estimated location. In another embodiment, the coarse altitude is obtained from altitude data stored on the receiver, for example by averaging 3-dimensional position fixes stored at the receiver, simply by using the last known altitude from a most recently determined last 3-dimensional position fix, or by utilizing the output of an altitude sensor or other devices. For instance, a barometer could be attached to the receiver to determine an altitude. A bluetooth transmitter could be installed in different floors to derive an altitude, which is then being received remotely by the mobile receiver. In another embodiment, the receiver is assumed to be at Mean Sea Level (MSL), and a table having MSL deviations from the reference ellipsoid is used to determine a GPS altitude above the referenced ellipsoid.

In FIG. 4, at block 420, the coarse altitude is used to estimate a 3-dimensional location, thus providing a derived altitude. If only a 2-dimensional solution is available, the coarse altitude can be used as the derived altitude. At block 430, a reference altitude is determined based upon the estimated location, either by the receiver or by the network as discussed above.

In FIG. 4, at block 440, the derived altitude is compared with the reference altitude determined based upon the estimated location. The comparison may be made either at the receiver or at the network. In embodiments where the comparison is made at the network, the derived altitude is sent from the receiver to the network. In embodiments where the comparison is made at the receiver, the network transmits the reference altitude information back to the receiver. The reference altitude information may be an altitude difference between the reference and derived altitudes, or the reference altitude.

In FIG. 4, at block 450, if the difference between the derived and reference altitudes exceeds a threshold, a new estimated location is determined at block 460 based upon the reference altitude. The process then iterates by determining a new reference altitude based upon the new estimated location at block 430. There after, the reference altitude and derived altitude of the new estimated location are again compared, and the iteration continues until some condition is met, for example the difference between the derived and reference altitudes is at or less than the altitude threshold, or the estimated location converges toward a stable solution. An error variance may be assigned to the altitude measurement, wherein the error variance is a function of the terrain or digital map or other source for the reference altitude.

Figure 5:
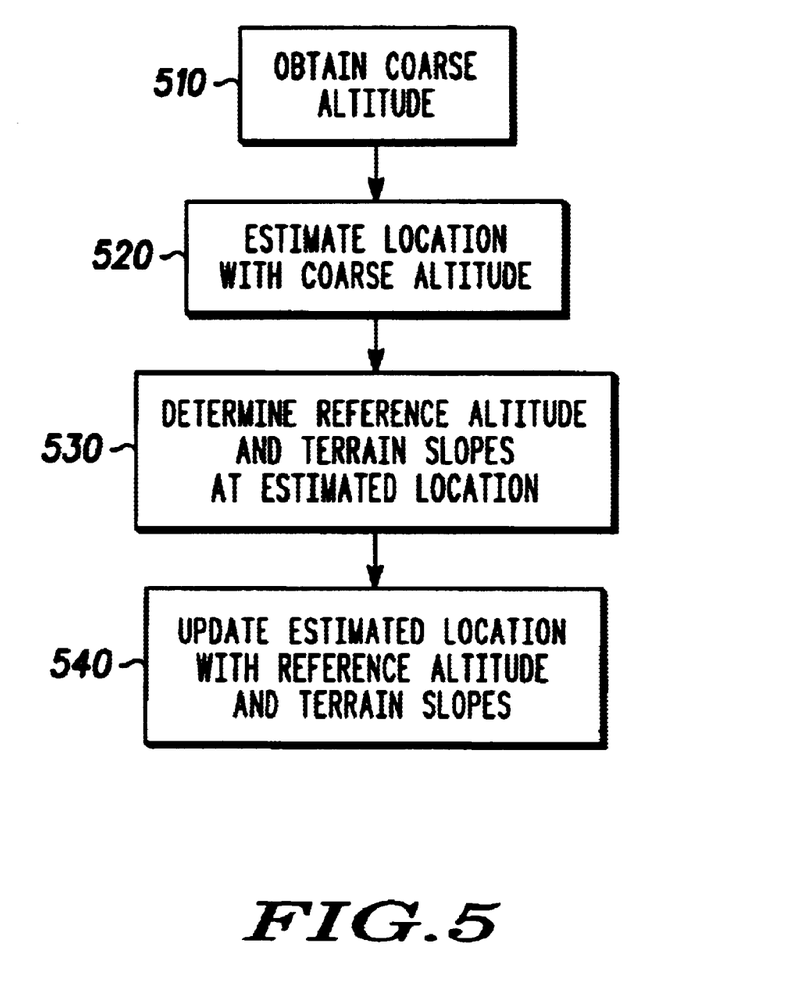
FIG. 5 is another exemplary flow diagram.

In another embodiment, the new location is based on the reference altitude, as discussed above, and based upon terrain slope information at the estimated location. In FIG. 5, at block 510, the coarse altitude is obtained as discussed above, and the location is estimated with the coarse altitude at block 520. In block 530, the reference altitude is determined by using the estimated location as discussed above. At block 530, terrain slope information is also obtained at the estimated location. At block 540, the estimated location is updated with the reference altitude and the terrain slope information.

The effect of terrain slope is compensated by including the terrain slope directly in a measurement gradient matrix, as detailed in the following equations. The pseudo range residual used by the handset can be expressed as:

$$PR_{res} = U_e \delta p_e + u_n \delta p_n + u_h \delta h \quad \text{Eq. (1)}$$

where $u_e$, $u_n$, and $u_h$ are the components of the line of sight (LOS) vector to the satellite of interest; $\delta p_e$, $\delta p_n$, $\delta_h$ are the errors in the assumed horizontal position components and altitude, respectively. Given the slope measurements derived by the infrastructure, the altitude correction can be modeled as:

$$\delta h^m = \delta h_b + s_e \delta p_e + s_n \delta p_n \quad \text{Eq. (2)}$$

where $\delta h_b$ is the bias in the terrain map, and $s_e$ and $s_n$ are the terrain slopes with respect to east and north position variations. Given this explicit modeling of the terrain variation with position, the normal iterations of a weighted least square (WLS) algorithm will produce a convergence to the true position, without requiring multiple messages from the network or multiple iterations. The terrain must be relatively smooth within the region of convergence for the approach to work effectively. The new location at the receiver may thus be determined based upon the altitude information and terrain slope estimates without iteration.

Figure 6:
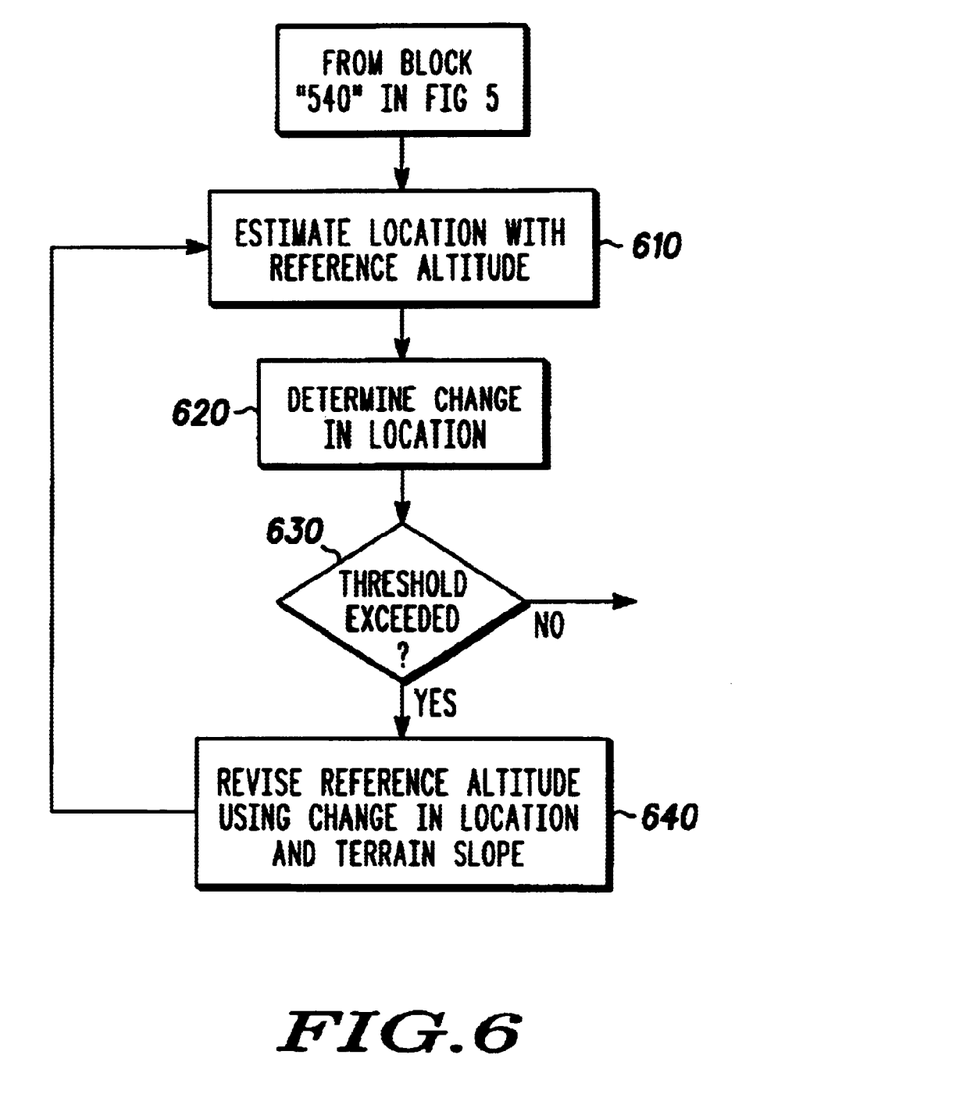
FIG. 6 is an alternative flow diagram.

In FIG. 6, at block 610, an estimated location is determined with the reference altitude, and then at block 620, a change in altitude is determined by calculating the difference between two most recent estimated location determinations. The reference altitude is revised using the change in location and terrain slope information. In some embodiments, the process iterates back to block 610 where the estimated location is revised with the revised reference altitude, until the threshold requirement is satisfied.

In still another embodiment, satellite information used to determine the estimated location is transmitted to the network with the estimated location and any derived altitude, for example at block 312 in FIG. 3. A difference between the derived altitude and the reference altitude is determined, and a corrected location of the receiver based upon the satellite information and the difference is determined at the network. Any weighting factors used to determine the estimate location of the receiver may also be transmitted to the network for use in determining the receiver location. Once the correct altitude and location of the receiver is determined, the newly determined 3-dimensional position fix can be transmitted back to the receiver or handset. This method can effectively remove the iteration steps used by other embodiments discussed above.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

What is claimed is:

1. A method in a satellite positioning system receiver, comprising:
    determining an estimated location of the receiver at the receiver;
    transmitting the estimated location to a network;
    receiving from the network altitude information based upon the estimated location of the receiver;
    determining a new location of the receiver at the receiver based upon the altitude information received from the network.

2. The method of claim 1, determining the estimated location of the receiver based upon a coarse altitude of the receiver.

3. The method of claim 2, requesting and receiving the coarse altitude from the network.

4. The method of claim 1, determining a derived altitude based upon the estimated location of the receiver, the altitude information from the network including a reference altitude, determining the new location of the receiver if a difference between the derived and reference altitudes is outside an altitude threshold.

5. The method of claim 1, receiving at the receiver terrain slope estimates at the estimated location from the network, determining the new location at the receiver based upon the altitude information and terrain slope estimates received from the network.

6. A method in a satellite positioning system receiver, comprising:
   determining an estimated location of the receiver based on information received from a wireless communications network;
   determining a reference altitude of the receiver based upon the estimated location of the receiver;
   determining a new location of the receiver based upon the reference altitude.

7. The method of claim 6, determining the reference altitude of the receiver by using the estimated location to index the reference altitude in a map database.

8. The method of claim 6, determining the estimated location of the receiver based upon a coarse altitude of the receiver.

9. The method of claim 6, determining a derived altitude from a 3-dimensional estimated location of the receiver, determining the new location of the receiver if a difference between the derived altitude and the reference altitude of the receiver is outside an altitude threshold.

10. The method of claim 6, determining the new location at the receiver based upon the reference altitude of the receiver and terrain slope information for the estimated location.

11. The method of claim 6, determining the reference altitude of the receiver based upon the estimated location of the receiver and based upon 3-dimensional location fix altitude information.

12. The method of claim 6,
   determining the estimated location with a coarse altitude,
   determining the reference altitude and terrain slope information at the estimated location,
   updating the estimated location with the reference altitude and the terrain slope information.

13. The method of claim 6,
   determining the estimated location with a coarse altitude,
   determining the reference altitude with terrain slope information in the vicinity of the estimated location.

14. The method of claim 6, the estimated location is a previously generated 3-dimensional location of the receiver, computing a derived altitude from the 3-dimensional location, determining the reference altitude of the receiver from the derived altitude.

15. A satellite positioning system receiver location method, comprising:
   determining at the receiver, an estimated location of the receiver;
   transmitting the estimated location of the receiver to a network;
   determining a reference altitude of the receiver at the network based upon the estimated location of the receiver;
   determining a new location of the receiver based upon the reference altitude of the receiver.

16. The method of claim 15, determining the reference altitude of the receiver by using the estimated location to index the reference altitude of the receiver in a map database on the network.

17. The method of claim 15, determining the estimated location of the receiver based upon a coarse altitude of The receiver.

18. The method of claim 17, determining the new location of the receiver only if a difference between the coarse and reference altitudes is outside an altitude threshold.

19. The method of claim 18, determining the new location of the receiver at the network.

20. The method of claim 15,
   the estimated location is a 3-dimensional location fix, determining a derived altitude from the estimated location,
   transmitting satellite information used to determine the 3-dimensional location fix of the receiver to the network,
   determining a difference between the derived altitude and the reference altitude, determining a corrected location of the receiver based upon the satellite information and the difference.

21. The method of claim 20, transmitting weighting factors used to determine the estimated location of the receiver to the network, determining a corrected location of the receiver based upon the satellite information, the weighting factors, and the difference between the derived altitude and the reference altitude at the network.

22. A method in a satellite positioning system receiver, comprising:
   determining a change in estimated location of two previously estimated locations,
   at least one of the previously estimated locations based upon a reference altitude;
   revising the reference altitude using the change in estimated location and terrain slope information,
   determining a new location using the revised reference altitude.

* * * * *